(12) United States Patent
Barbour et al.

(10) Patent No.: US 10,701,008 B2
(45) Date of Patent: Jun. 30, 2020

(54) PERSONAL MUSIC COMPILATION

(71) Applicant: FACEBOOK, INC., Menlo Park, CA (US)

(72) Inventors: Christopher Barbour, Mountain View, CA (US); Christopher William Jones, Mill Valley, CA (US)

(73) Assignee: FACEBOOK, INC., Menlo Park, CA (US)

( * ) Notice: Subject to any disclaimer, the term of this patent is extended or adjusted under 35 U.S.C. 154(b) by 607 days.

(21) Appl. No.: 14/973,076

(22) Filed: Dec. 17, 2015

(65) Prior Publication Data

US 2017/0180288 A1 Jun. 22, 2017

(51) Int. Cl.
*G06F 15/16* (2006.01)
*H04L 12/58* (2006.01)
*H04L 29/08* (2006.01)
*H04W 4/21* (2018.01)

(52) U.S. Cl.
CPC .............. *H04L 51/10* (2013.01); *H04L 51/32* (2013.01); *H04L 67/22* (2013.01); *H04L 67/306* (2013.01); *H04W 4/21* (2018.02)

(58) Field of Classification Search
CPC ....................................................... H04L 51/10
See application file for complete search history.

(56) References Cited

U.S. PATENT DOCUMENTS

2006/0143236 A1* 6/2006 Wu ........................ G11B 27/034
2008/0270532 A1* 10/2008 Billmaier ................ H04L 67/32
709/203
2008/0320139 A1* 12/2008 Fukuda ................. G06Q 30/02
709/226
2010/0162115 A1* 6/2010 Ringewald ........... G11B 27/034
715/716
2015/0032769 A1* 1/2015 Rose ........................ G06F 16/60
707/769
2015/0039644 A1* 2/2015 Trivedi ................... H04L 67/22
707/767

OTHER PUBLICATIONS

Display your photos to the beat of the music—Musical Editing Adjustment in MAGIX Photostory on DVD, MAGIX Magazine, News, Inspiration & Stories about our Multimedia Software, Jul. 11, 201, 8 pages.
Larson, Retrojam makes a simple mixtape of all the songs you listened to as a kid, The Daily Dot, Feb. 1, 2015, 5 pages.

* cited by examiner

*Primary Examiner* — Kevin T Bates
*Assistant Examiner* — Clarence D McCray
(74) *Attorney, Agent, or Firm* — Keller Jolley Preece

(57) ABSTRACT

Exemplary methods, apparatuses, and systems receive, from a first user of a network service, an identifier associated with an account within the network service for a second user and data that is descriptive of the second user. Based upon the descriptive data, a plurality of candidate songs is selected and presented to the first user. A selection of a plurality of the candidate songs is received from the first user. A media object including the selected songs as a musical compilation is generated and published to the network service. In response to receiving an interaction with the media object, the network service plays the musical compilation.

20 Claims, 11 Drawing Sheets

PERSONAL MUSIC COMPILATION

FIELD

The various embodiments described herein relate to generating and publishing content to a network service, such as a social networking system. In particular, the embodiments relate to generating a personalized music compilation for another user of the network service.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems include a network service receiving, from a first user, an identifier associated with an account within the network service for a second user and data that is descriptive of the second user. For example, a first user of a social networking system may identify a second user of the social networking system for which the first user wishes to create a personal musical compilation. In one embodiment, the social networking system determines, based upon user data and action history, a candidate second user and/or potential descriptive data for the second user. The first user may then select a second user and/or candidate descriptive data proposed by the social networking system. In another embodiment, the first user provides an identifier and/or descriptive data for the second user. Based upon the descriptive data inputted or selected by the first user, the network service selects and presents a plurality of candidate songs to the first user. For example, if the descriptive data for the second user indicates that the second user's wedding in 1987 is important to the second user, the network service selects candidate songs that were popular at wedding receptions in 1987. In one embodiment, songs are selected based upon one or more of: mapping between songs and the descriptive data, popularity, determined musical taste of the first user, determined musical taste of the second user, demographic data of the first user, and/or demographic data of the second user. The network service receives the first user's selection of songs from the plurality of the candidate songs and generates a media object including the selected songs as a musical compilation. In one embodiment, the first user selects media to include as a part of the media object. For example, the user selects a representation of the compilation (e.g., a mix tape), decorates the representation, selects photos and/or videos for a slideshow, and adds a personal message. The generated media object is published to the network service. In response to receiving an interaction with the media object, the network service plays the musical compilation. For example, the selected photos may be displayed as a slideshow while the selected songs playback.

Other features and advantages will be apparent from the accompanying drawings and the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein generate and publish a personal music compilation. In particular, embodiments utilize data that is descriptive of a network service user to select a plurality of candidate songs for the compilation. For example, social networking data may be used to determine important themes for the user or the musical taste of the user. The music compilation may be further personalized with pictures, videos, and other media. As a result, users are able to generate and share personal content in a manner nostalgic of the mix tape of decades past.

In the following description, numerous specific details are set forth. However, it is understood that embodiments of the invention may be practiced without these specific details. While a social networking system is used to describe embodiments of promotion configuration and facilitation, it will be understood that these concepts are generally applicable to other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
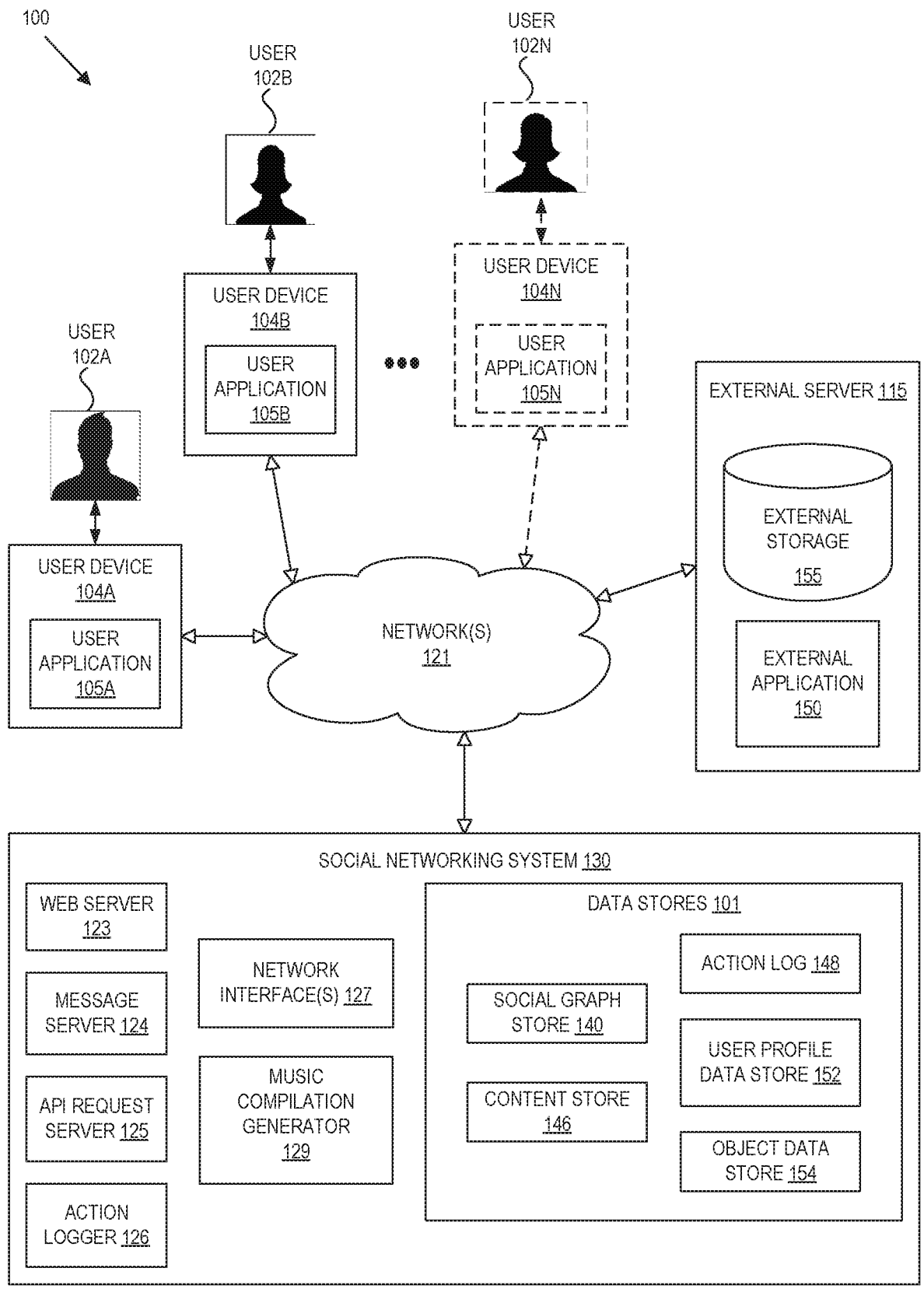
FIG. 1 illustrates an exemplary network environment of a social networking system to generate and publish a personal music compilation.

FIG. 1 illustrates an exemplary network environment of social networking system 130 (or other network service) to generate and publish a personal music compilation. Social networking system 130 offers its users 102A-102N the ability to communicate and interact with other users 102A-102N and entities of the social networking system 130 according to an embodiment of the invention. The user devices 104A-104N are enabled to interact with social networking system 130 and can be any type of computing device capable of receiving user input as well as transmitting and/or receiving data via a network (e.g., network 121). Exemplary user devices 104A-104N include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices programmed to implement one or more embodiments set forth herein.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native platform or operating system of the user device 104A, such as Windows®, Mac OSX®, iOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In some embodiments, the social networking system 130 comprises one or more computing devices storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, a song, an album, an article, a book, a movie, food, etc.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, the embodiment of the social networking system 130 includes an API request server 125, a web server 123, a message server 124, an action logger 126, and a set of data stores 101. This embodiment also includes, within the data stores 101, a social graph store 140, a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, interests, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a "post." In one embodiment, a post is published within a feed of messages received by or otherwise accessible to one or more other users. In some embodiments, a user can publish a post or otherwise send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, creating a post or otherwise sending a message to another user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, publishing the playback of a song, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a music service or other system (e.g. external application 150) may send an API request to the social networking system 130 via the network 121 to publish a story on behalf of a user (e.g., the user played a song), request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a band, business, vendor, organization, university, etc. However, in some embodiments of the invention, an entity may represent a musician, celebrity, or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, social networking system 130 includes music compilation generator 129 for generating and publishing personal music compilations in accordance with an embodiment of the invention. In an alternate embodiment, the music compilation generator 129 is a part of the external server 115. For example, the music compilation generator 129 may be implemented by the external application 150.

In one embodiment, music compilation generator 129 implements a method of generating and publishing a personal music compilation. For example, music compilation generator 129 utilizes an identifier associated with a network service user account and data that is descriptive of the user. Based upon the descriptive data, music compilation generator 129 selects and presents a plurality of candidate songs. Music compilation generator 129 receives selection of a plurality of the candidate songs and generates media object including the selected songs as a musical compilation. Music compilation generator 129 publishes the generated media object to the network service. In response to receiving an interaction with the media object, the network service plays the musical compilation. An exemplary method of generating and publishing a personal music compilation is described in greater detail with reference to FIGS. 3-10.

In one embodiment, music compilation generator 129 generates a GUI including a plurality of selectable elements for the generation and publication of a personal music compilation. The generation and publication of a personal musical compilation via a GUI is described in greater detail herein with reference to FIGS. 4-10.

Figure 2:
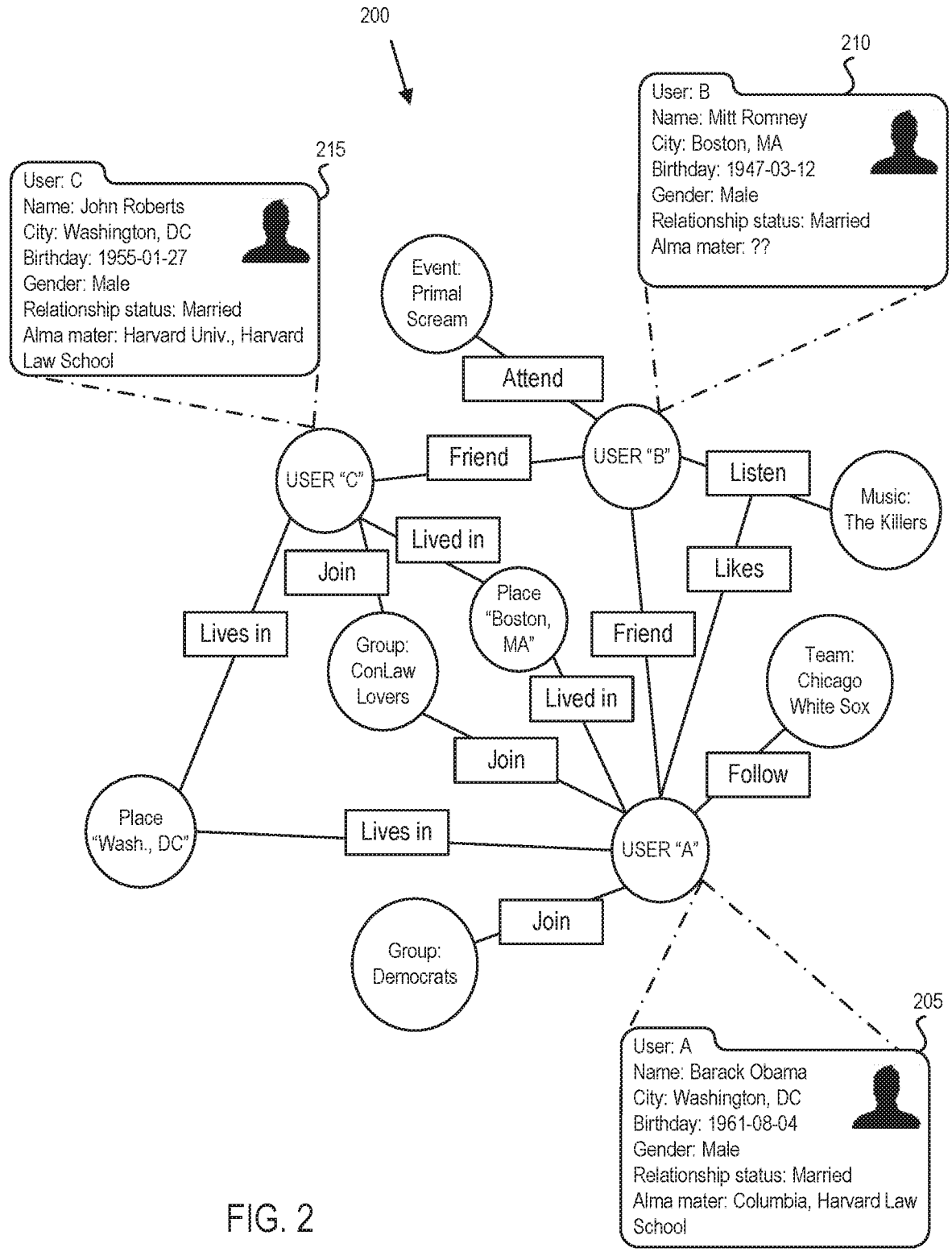
FIG. 2 illustrates an exemplary graph of social network data used to generate and publish a personal music compilation.

FIG. 2 illustrates exemplary graph 200 of social network data used to generate and publish a personal music compilation. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, music compilation generator 129 utilizes user characteristics stored in or derived from graph 200 to prompt a user to generate a music compilation, to recommend a recipient for a musical compilation, to filter or otherwise select candidate descriptive data for a user, to filter or otherwise select candidate songs for a musical compilation, and/or to filter or otherwise select candidate media to accompany a musical compilation. In one embodiment, users may select privacy settings to control what network service data is shared, with whom the data is shared, and/or what data used for selecting candidate objects or otherwise used in the generation of a music compilation.

Figure 3:
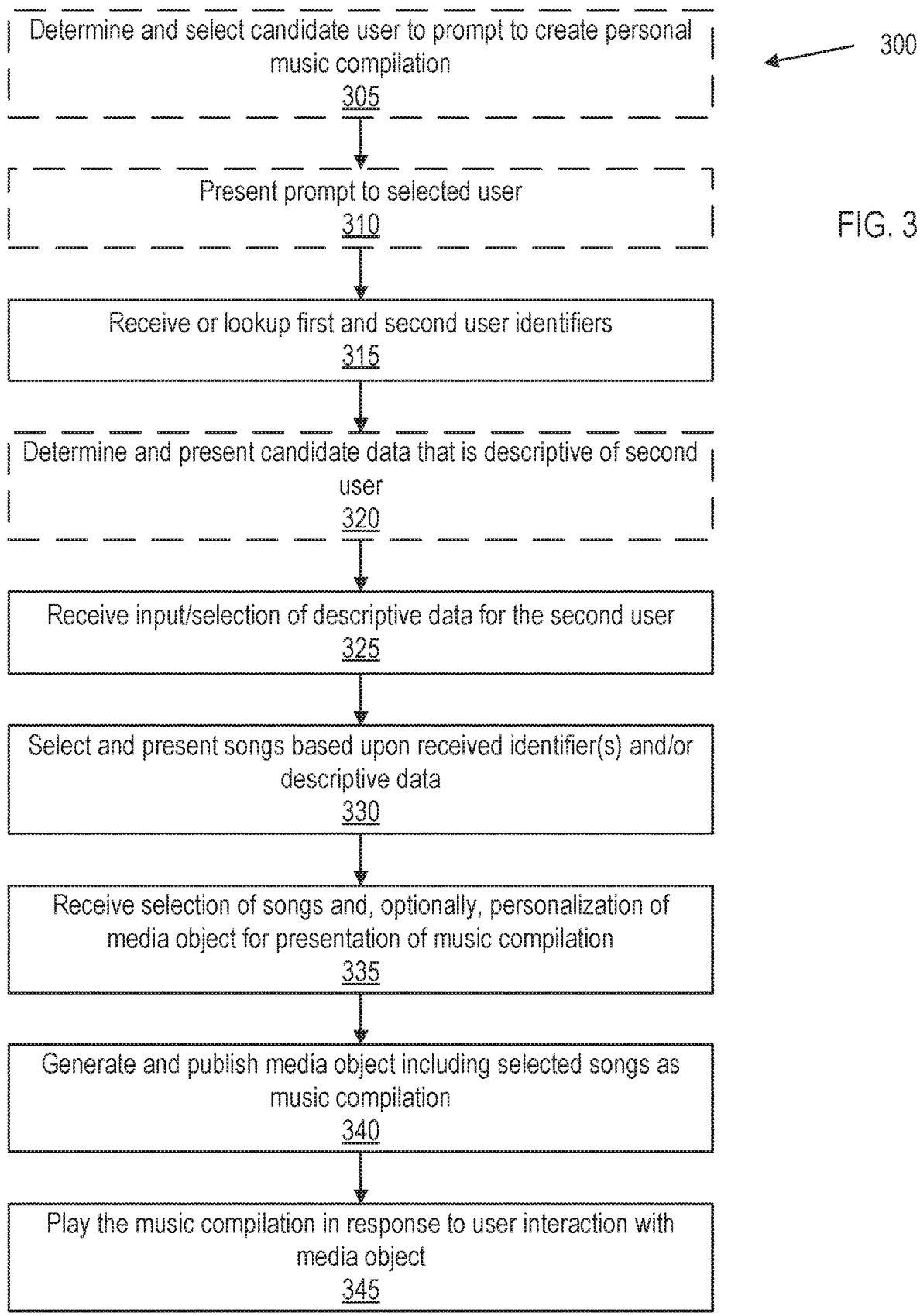
FIG. 3 illustrates an exemplary method of generating and publishing a personal music compilation.

FIG. 3 illustrates exemplary method 300 of generating and publishing a personal music compilation. At block 305, music compilation generator 129 optionally determines and selects a candidate user to receive a prompt to create a personal music compilation. For example, personal music compilation may be targeted for Father's Day or another day of celebration, holiday, or other event. Using Father's Day as an example, music compilation generator 129 may select users of a particular age range (e.g., millennials) that may have a father that would likely have some nostalgia about a mix tape or otherwise appreciate a music compilation. Music compilation generator 129 may filter candidates for the prompt to target users that have, e.g., a father with a social networking account. Music compilation generator 129 may otherwise filter candidates based upon an event or marketing theme associated with promoting the generation of a personal music compilation. In one embodiment, music compilation generator 129 filters candidates based upon geographic location, demographic data, historical user actions within the social networking system, or another criterion.

At block 310, music compilation generator 129 optionally presents the prompt to the selected user. Following the Father's Day example above, music compilation generator 129 publishes a post to the social networking system to be viewed by the selected group of one or more users. An exemplary prompt is described in further detail herein with reference to FIG. 4.

At block 315, music compilation generator 129 receives, looks up, or otherwise identifies a user identifier for a first user. For example, the first user accesses music compilation generator 129 within a current session within the social networking system or otherwise logs in or provides the user identifier.

In one embodiment, music compilation generator 129 receives, looks up, or otherwise identifies a user identifier for a second user. Following the Father's Day example above, music compilation generator 129 may use social graph data to identify the first user's father as the second user. Alternatively, music compilation generator 129 presents one or more candidate second users based upon affinity between first and second users, similarity in musical taste between users, an event or occasion affecting or related to one or both users, etc. In one embodiment, the first user selects or provides an identifier for the second user. The identifier may be an email address, username, or other unique identifier used by the social networking system.

In one embodiment, only a single user identifier is used by music compilation generator 129. For example, users may generate personal music compilations for themselves rather than other users. For the sake of simplicity in explaining embodiments herein, however, the following description will refer to a first user generating a personal music compilation to be received or otherwise viewed by a second user.

At block 320, music compilation generator 129 optionally determines and presents candidate data is descriptive of the second user. For example, utilizing the identifier for the second user, music compilation generator 129 may access social graph store 140, action log 148, user profile data store 152, or another data store 101 to identify data that is descriptive of the second user. Descriptive data may include events, interests, or activities of import to the second user. Significant life events for the second user, such as graduation from a school, starting a new job, the beginning of a relationship, a wedding, the birth of a child, etc. may be included within data stores 101 in the form of text and/or media posted to the social networking system. Interests and activities, including interests other than specific music/genre of music and activities other than listening to music (such as cooking, sports, science-fiction, etc.), may also be included data stores 101. Candidate descriptive data may be selected based upon the second user's explicit expression of affinity (e.g., listed as an interest or hobby) or implicit expression of affinity (e.g., a threshold number of posts published to the social networking system indicating that the second user engaged in an activity showing the interest). Upon selecting one or more candidate descriptive data points, music compilation generator 129 presents the one or more candidate descriptive data points to the first user as options in the personalization of the music compilation.

In one embodiment, the candidate descriptive data is identified by analyzing images or video associated with the second user. For example, the second user may have uploaded pictures to a social networking system photo album or the second user may have been tagged in one or more pictures uploaded by another user. The social networking system may identify visual attributes or otherwise classify photographs based upon the analysis of the images as described in U.S. Patent Application Publication No. 2015/0036919, which is hereby incorporated by reference in its entirety. If the second user has uploaded a threshold amount of photographs of him/her engaging in a particular activity, music compilation generator 129 determines that activity to be of import to the second user and presents the activity as a candidate descriptive data point.

At block 325, music compilation generator 129 receives user selection of descriptive data or otherwise receives input including the descriptive data for the second user. As described above, the descriptive data may include an event, interest, or activity that is special to the second user. Additionally, the descriptive data may include other data that is descriptive of the second user, e.g., the first user's favorite thing about the second user or a quality, event, interest, or activity the first user associates with the second user. In one embodiment, the first user selects descriptive data from a list of popular or determined descriptive data points. Alternatively, the user enters the descriptive data into a text input box.

In one embodiment, the descriptive data includes a date that is associated with the event, interest, or activity or otherwise special to the second user. For example, if the second user's wedding is an event selected to serve as descriptive data, the date of the wedding may be further used as descriptive data of that important event. In one embodiment, music compilation generator 129 determines the date based upon dates within data stores 101. For example, one or more posts published to the social network (or profile data) may include a date of the second user's wedding. Alternatively, the first user selects or otherwise inputs the date.

At block 330, music compilation generator 129 selects and presents songs based upon the identified user(s) and/or descriptive data. In one embodiment, music compilation generator 129 may store a data structure mapping descriptive data to sets of songs. For example, the selection of "wedding" as an event that is special to the second user may be mapped to a set of songs that were or are popular at wedding receptions. Additionally, a date included in the descriptive date may filter the set of songs. For example, a date may limit the set of songs to those songs that were popular at wedding receptions during or within a date range of a particular year. In one embodiment, music compilation generator 129 creates the mapping based upon the parsing of song lyrics. For example, a descriptive data point associating the second user with cooking may be mapped to a set of songs with lyrics including references to cooking and/or food.

In one embodiment, music compilation generator 129 filters candidate songs based upon the first and/or second user's taste in music. In one embodiment, users explicitly express their interest in specific music genres, bands, musicians, and/or songs. In another embodiment, the social networking system determines an implicit or estimated interest in music genres, bands, musicians, and/or songs based upon other user data. For example, the social networking system may determine that the second user is likely to like a particular genre of music based upon other user's explicit interest and a similarity to (in demographic data or social networking activity) or affinity between second user and those users that expressed the explicit interest. In yet another embodiment, music compilation generator 129 filters or otherwise selects candidate songs based upon general popularity, e.g., as indicated by total interactions within the social networking system, pop charts, awards, or another ranking of music.

At block 335, music compilation generator 129 receives selection of songs for inclusion in the music compilation. For example, the first user selects one or more of the candidate songs generated by music compilation generator 129. In one embodiment, the selection includes the first user searching for and selecting songs that were not presented as candidates by music compilation generator 129. For example, music compilation generator 129 may present the first user with a text input box or other search functionality to select other songs. In one embodiment, the selection of songs includes receiving an order in which the songs are to be played in the compilation.

In one embodiment, music compilation generator 129 receives input to personalize a media object to be generated for the presentation of the music compilation. For example, music compilation generator 129 may present the user with one or more images of a cassette tape, compact disc, record, or other image to serve as a representation of the compilation. Additionally, music compilation generator 129 may provide the user with the option of adding one or more labels with default or custom text, stickers, emoticons, or other decorations for the representation of the compilation. In one embodiment, music compilation generator 129 enables the user to input a personalized text message to be included in the presentation of the compilation. In another embodiment, music compilation generator 129 enables the user to select photographs, videos, or other media to include in the presentation of the compilation. For example, music compilation generator 129 may present the user with the option of selecting photographs from one or more albums stored within the social networking system or stored on the user's device. The first user selects and/or uploads the photographs for the inclusion in, e.g., a slideshow played during the playback of the music compilation.

In one embodiment, music compilation generator 129 selects photographs or other media from popular culture that are mapped to the descriptive data. For example, if a wedding and date are selected as descriptive data for the second user, music compilation generator 129 may use a data structure or other mapping to identify popular culture images of weddings from that era. For example, music compilation generator 129 may select a photograph of a celebrity wedding from the year within the descriptive data.

At block 340, music compilation generator 129 generates and publishes the media object including the selected songs as a music compilation. For example, music compilation generator 129 creates a media object that enables the playback of the selected songs. In an embodiment that includes additional personalization of the media object, music compilation generator 129 creates and publishes a post to the social networking system including the cassette tape or other representation, decorations, media/slideshow, etc. In one embodiment, the first user selects the audience for the published media object. For example, the published post may be accessible to the general public, limited to friends of the first user and/or second user, or just limited to one or more selected users (e.g., the second user).

At block 345, music compilation generator 129 causes the music compilation to be played in response to user interaction with the media object. For example, the second user may select or otherwise interact with a play button to cause the music compilation (and, if included, slideshow) to play.

Figure 4:
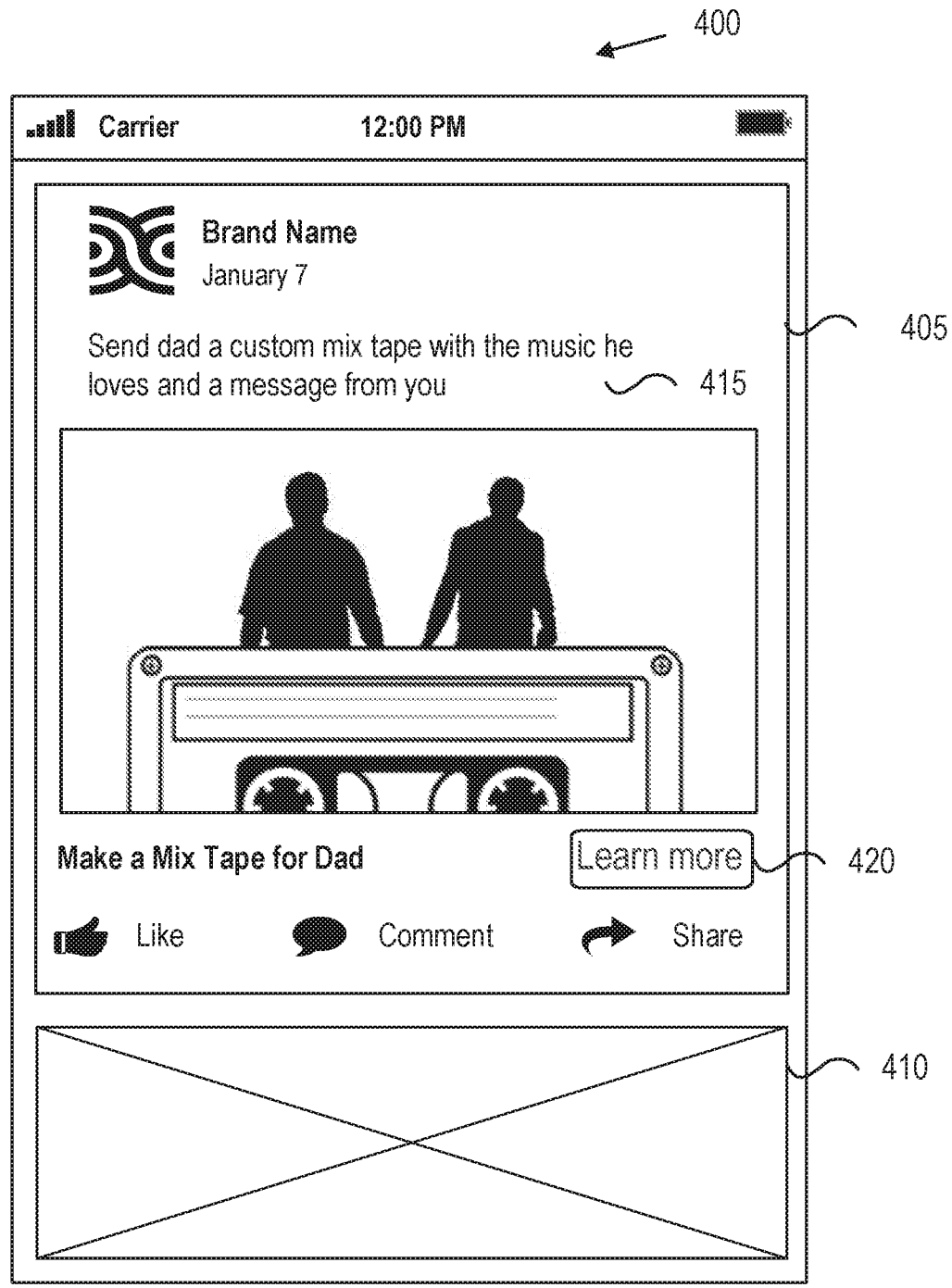
FIGS. 4-10 illustrate an exemplary user interface for generating and publishing a personal musical compilation.

FIGS. 4-10 each illustrate an exemplary user interface (UI) for generating and publishing a personal musical compilation. FIG. 4 includes a feed of posts to a social network, e.g., displayed to the first user. Post 405 and post 410 are currently visible within UI 400. Additional posts may be made visible in response to the user scrolling UI 400. Post 405 includes an exemplary prompt to encourage the first user to create a personal music compilation. For example, text 415 prompts the user to create a personal music compilation in honor of Father's Day or another event related to the first user's father. Post 405 enables the first user to initiate the generation of a music compilation via button 420.

Figure 5:

FIG. 5 illustrates exemplary UI 500 to enable the first user to provide music compilation generator 129 with an identifier for the first user's social networking account. For example, if the first user, Tina, has not already logged in or otherwise permitted music compilation generator 129 access to her social networking account, UI 500 provides a log in functionality to enable music compilation generator 129 to access Tina's social networking data and publish a music compilation on behalf of Tina.

Figure 6:
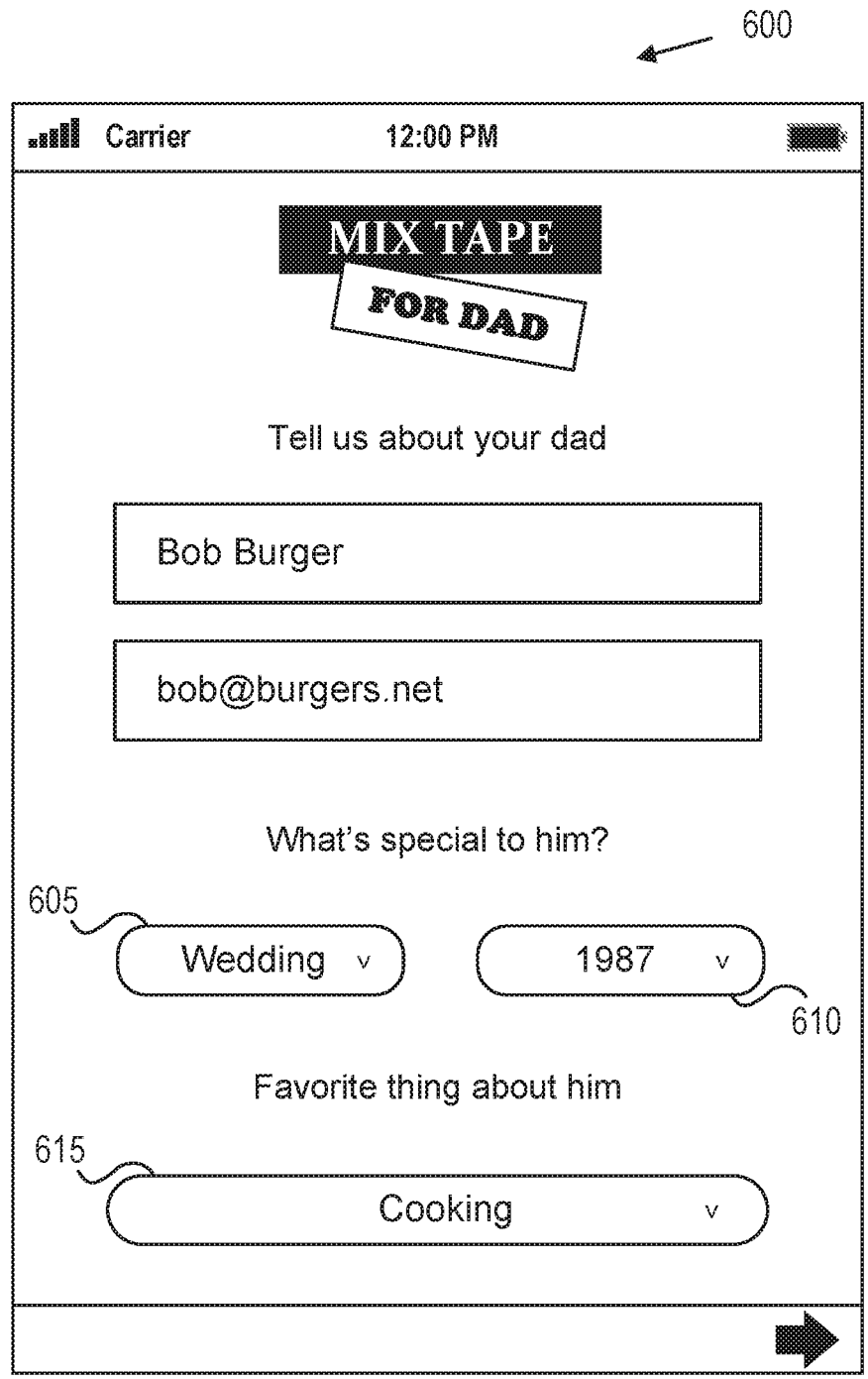

FIG. 6 illustrates exemplary UI 600 to enable the first user to provide an identifier and descriptive data for the second user. For example, Tina's dad, Bob, may be identified by full name, username, or email address. As described above, the first user may select or otherwise input descriptive data about the second user to enable music compilation generator 129 to select candidate songs for the music compilation. In the illustrated example, Tina has selected from drop-down menus 605 and 610 Bob's wedding in 1987 as something that is special to Bob. Additionally, Tina has selected from drop-down menu 615 that one of her favorite things about Bob is his cooking.

Figure 7:
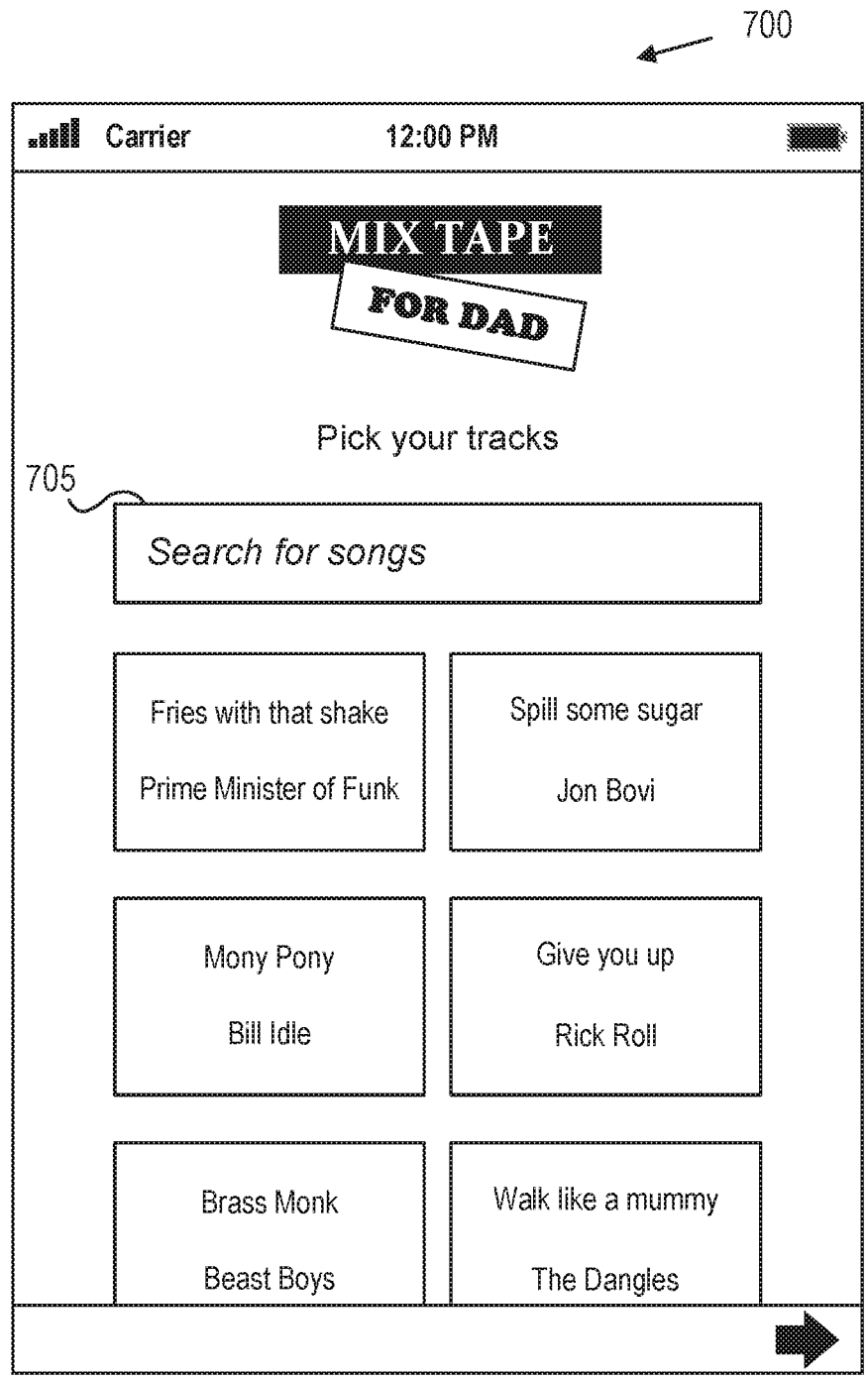

FIG. 7 illustrates exemplary UI 700 to enable the first user to search for songs in text input box 705 or select from a plurality of candidate songs. In one embodiment, as described above, music compilation generator 129 selects candidate songs based upon the descriptive data. The candidate songs illustrated in UI 700 were mapped by music compilation generator 129 including lyrics or themes that match "cooking" or food generally and songs that were popular at wedding receptions in or around 1987. In one embodiment, music compilation generator 129 selects candidate songs that match the determined musical taste for the first and/or second user.

Figure 8:

FIG. 8 illustrates exemplary UI 800 to enable the first user to decorate a media object or other image included within the music compilation media object. For example, the illustrated example includes buttons to enable the first user to select between cassette images and select stickers and labels to decorate the selected cassette. The exemplary cassette has been decorated by the first user to include a custom label including the text "For the Old Man" and a sticker of a smiley face wearing sunglasses.

Figure 9:
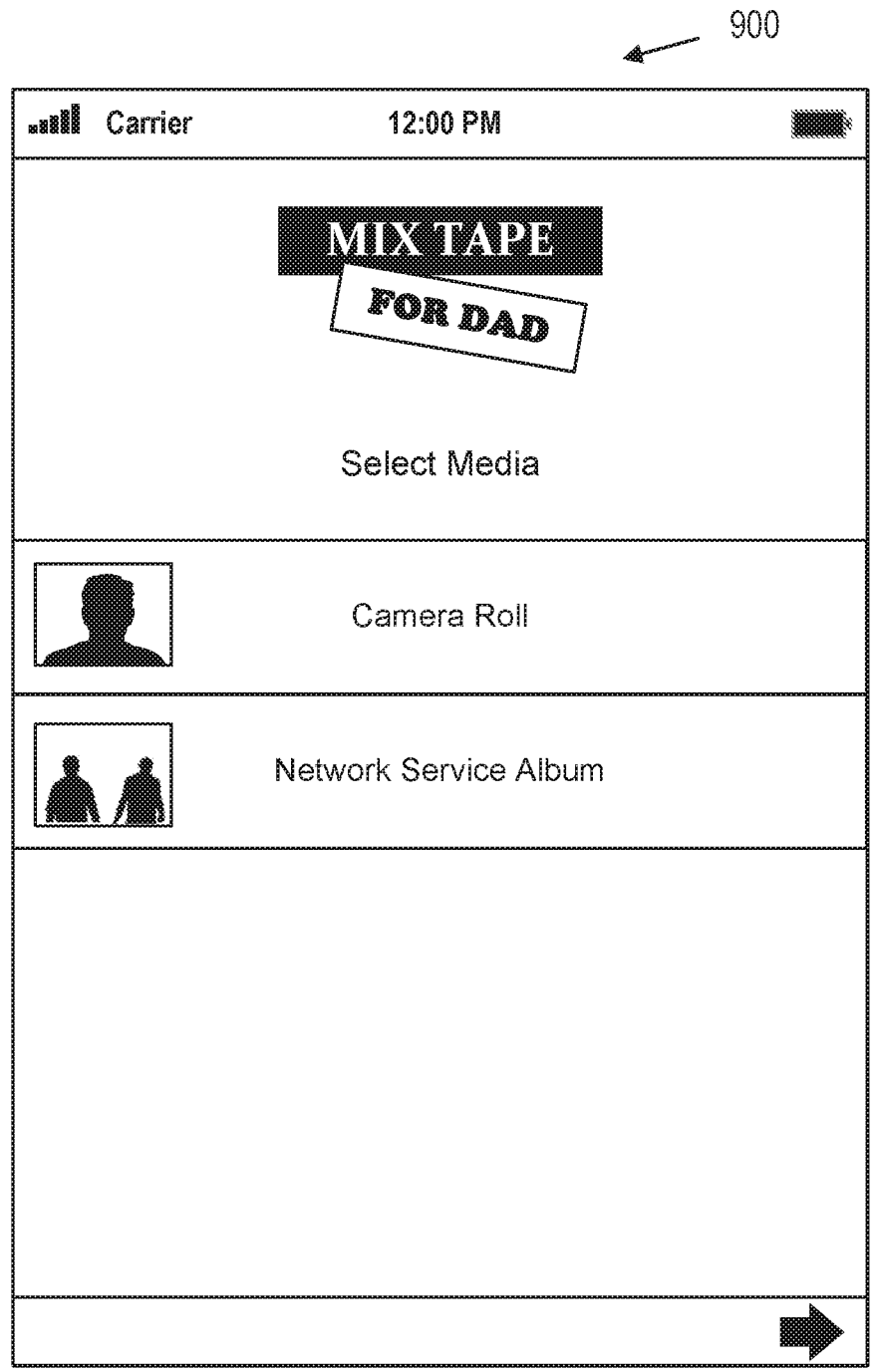

FIG. 9 illustrates exemplary UI 900 to enable the first user to select photographs or video to include, e.g., in a slideshow as a part of the music compilation media object. For example, user selection of "Camera Roll" triggers access to photographs and/or video stored on the first user's device. User selection of "Network Service Album" triggers access to photographs and/or video stored within the social networking system or other network service.

Figure 10:
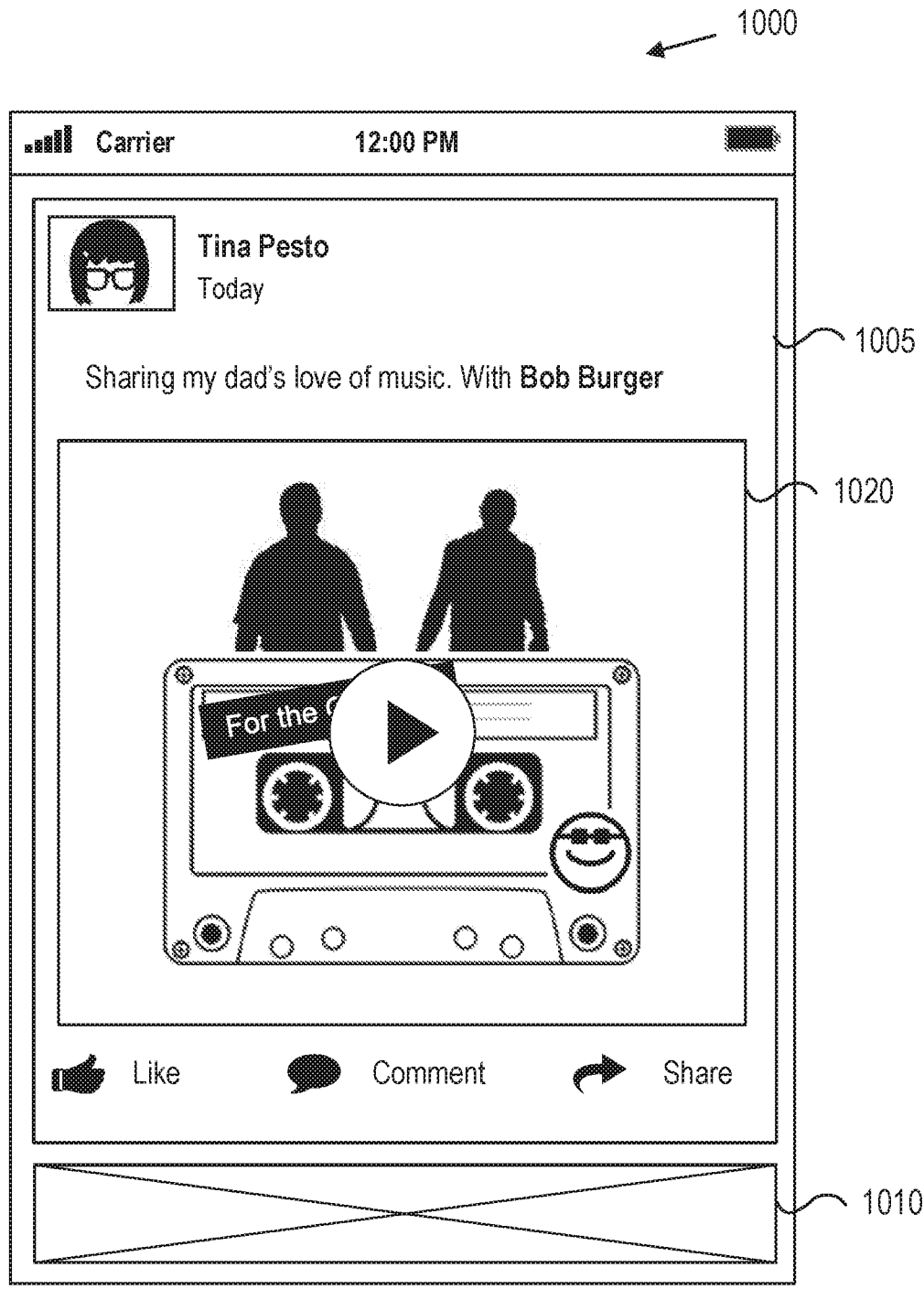

FIG. 10 illustrates exemplary UI 1000 including a feed of posts to a social network, e.g., displayed to the second user. Post 1005 and post 1010 are currently visible within UI 1000. Additional posts may be made visible in response to the user scrolling UI 1000. Post 1005 includes an exemplary published media object 1020 including the generated personal music compilation. Media object 1020 includes a play button to enable playback of the music compilation and, if included, presentation of a slideshow, media, or other decorations selected by the first user.

Figure 11:
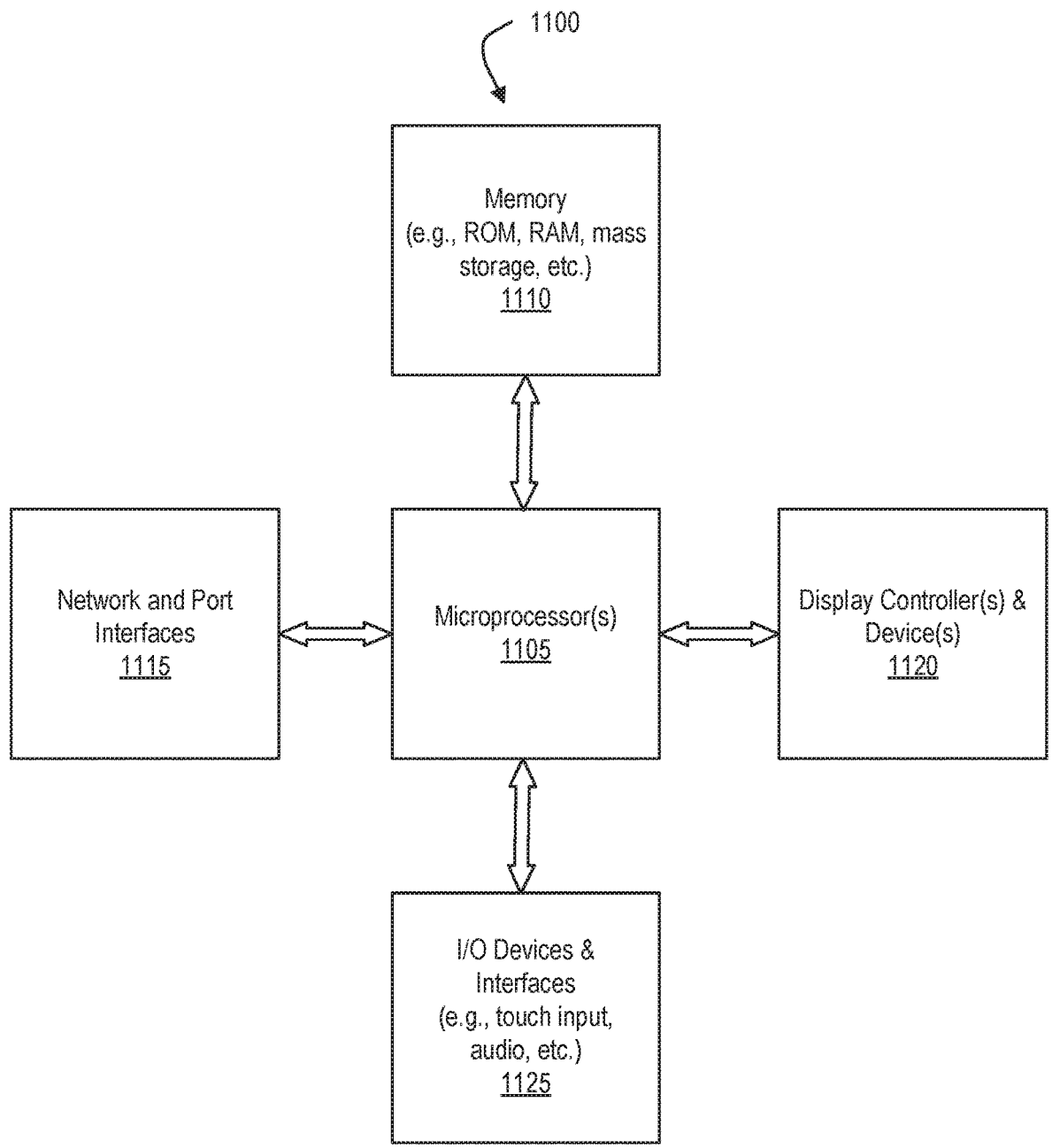
FIG. 11 illustrates, in block diagram form, an exemplary processing system to generate and publish a personal music compilation.

FIG. 11 illustrates, in block diagram form, exemplary processing system 1100 to generate and publish a personal music compilation. Data processing system 1100 is an exemplary representation of one or more of the user devices 104, external server 115, social networking system 130, or components thereof.

Data processing system 1100 includes one or more microprocessors 1105 and connected system components (e.g., multiple connected chips). Alternatively, data processing system 1100 is a system on a chip.

Data processing system 1100 includes memory 1110, which is coupled to microprocessor(s) 1105. Memory 1110 may be used for storing data, metadata, and programs for execution by the microprocessor(s) 1105. For example, memory 1110 may include one or more of the data stores 101 and/or may store modules, such as music compilation generator 129, described herein. Memory 1110 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1110 may be internal or distributed memory.

Data processing system 1100 includes network and port interfaces 1115, such as a port, connector for a dock, or a connector for a USB interface, FireWire, Thunderbolt, Ethernet, Fibre Channel, etc. to connect the system 1100 with another device, external component, or a network. Exemplary network and port interfaces 1115 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1100 with another device, external component, or a network and receive stored instructions, data, tokens, etc.

Data processing system 1100 also includes display controller and display device 1120 and one or more input or output ("I/O") devices and interfaces 1125. Display controller and display device 1120 provides a visual user interface for the user. I/O devices 1125 allow a user to provide input to, receive output from, and otherwise transfer data to and from the system. I/O devices 1125 may include a mouse, keypad or a keyboard, a touch panel or a multi-touch input panel, camera, optical scanner, audio input/output (e.g., microphone and/or a speaker), other known I/O devices or a combination of such I/O devices. One or more buses may be used to interconnect the various components shown in FIG. 11.

Data processing system 1100 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1100 may be a network computer, server, or an embedded processing device within another device or consumer electronic product. As used herein, the terms computer, device, system, processing system, processing device, and "apparatus comprising a processing device" may be used interchangeably with data processing system 1100 and include the above-listed exemplary embodiments.

Additional components, not shown, may also be part of data processing system 1100, and, in certain embodiments, fewer components than that shown in FIG. 11 may also be used in data processing system 1100. It will be apparent from this description that aspects of the inventions may be embodied, at least in part, in software. That is, the computer-implemented method 300 may be carried out in a computer system or other data processing system 1100 in response to its processor or processing system 1105 executing sequences of instructions contained in a memory, such as memory 1110 or other non-transitory machine-readable storage medium. The software may further be transmitted or received over a network (not shown) via network interface device 1115. In various embodiments, hardwired circuitry may be used in combination with the software instructions to implement the present embodiments. Thus, the techniques are not limited to any specific combination of hardware circuitry and software, or to any particular source for the instructions executed by data processing system 1100.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving, from a first user of a network service, an identifier associated with an account within the network service for a second user;
based on receiving the identifier, parsing a history of activity by the second user within the network service to identify one or more events, interests, or activities;
presenting a list of the one or more identified events, interests, or activities to the first user;
receiving, from the first user of the network service, a selection of data that is descriptive of the second user, wherein the descriptive data includes an event, interest, or activity included in the list of the one or more identified events, interests, or activities;
identifying, based on accessing network service data of the second user, a social networking characteristic descriptive of the second user;
determining a class of the second user comprising other users of the network service that share the social networking characteristic with the second user;
determining, based on network service data, explicit song interests of the other users in the class of the second user;
selecting, based upon the descriptive data and the explicit song interests, a plurality of candidate songs, wherein the candidate songs comprise the explicit song interests;
presenting, to the first user in response to receiving the descriptive data, the plurality of candidate songs;
receiving, from the first user, selected songs comprising a plurality of the candidate songs;

generating a media object including the selected songs as a musical compilation;
publishing the media object to the network service; and
receiving, from the second user of the network service, an interaction with the media object that causes the network service to play the musical compilation.

2. The computer-implemented method of claim 1, wherein receiving the descriptive data includes receiving the descriptive data in a text input box.

3. The computer-implemented method of claim 1, wherein the descriptive data includes a date associated with the event, interest, or activity.

4. The computer-implemented method of claim 1, wherein identifying the class of the second user comprises:
accessing social networking data of the second user; and
based on the social networking data of the second user, identifying other users of the network service that share social networking characteristics with the second user, wherein the class of the second user comprises the identified other users.

5. The computer-implemented method of claim 1, wherein identifying the class of the second user comprises:
accessing demographic data of the second user; and
based on the demographic data of the second user, identifying other users of the network service that share demographic characteristics with the second user, wherein the class of the second user comprises the identified other users.

6. The computer-implemented method of claim 1, wherein parsing the history of activity by the second user includes analyzing images uploaded to the network service and associated with the second user to identify the one or more events, interests, or activities.

7. The computer-implemented method of claim 1, wherein selecting the plurality of candidate songs includes determining musical preferences of the second user from the history of activity by the second user within the network service and identifying songs that are mapped to the descriptive data and the determined musical preferences of the second user.

8. The computer-implemented method of claim 1, wherein selecting the plurality of candidate songs includes determining musical preferences of the first user from the history of activity by the first user within the network service and identifying songs that are mapped to the descriptive data and the determined musical preferences of the first user.

9. The computer-implemented method of claim 1, further comprising:
receiving, from the first user, a selection of one or more photos and/or videos, wherein the one or more photos and/or videos are displayed during playback of the musical compilation.

10. A non-transitory computer-readable medium storing instructions which, when executed by one or more processors in a processing device, cause the processing device to perform steps comprising:
receiving, from a first user of a network service, an identifier associated with an account within the network service for a second user;
based on receiving the identifier, parsing a history of activity by the second user within the network service to identify one or more events, interests, or activities;
presenting a list of the one or more identified events, interests, or activities to the first user;
receiving, from the first user of the network service, a selection of data that is descriptive of the second user, wherein the descriptive data includes an event, interest, or activity included in the list of the one or more identified events, interests, or activities;
identifying, based on accessing network service data of the second user, a social networking characteristic descriptive of the second user;
determining a class of the second user comprising other users of the network service that share the social networking characteristic with the second user;
determining, based on network service data, explicit song interests of the other users in the class of the second user;
selecting, based upon the descriptive data and the explicit song interests, a plurality of candidate songs, wherein the candidate songs the explicit song interests;
presenting, to the first user in response to receiving the descriptive data, the plurality of candidate songs;
receiving, from the first user, selected songs comprising a plurality of the candidate songs;
generating a media object including the selected songs as a musical compilation;
publishing the media object to the network service; and
receiving, from the second user of the network service, an interaction with the media object that causes the network service to play the musical compilation.

11. The non-transitory computer-readable medium of claim 10, wherein receiving the descriptive data includes receiving the descriptive data in a text input box.

12. The non-transitory computer-readable medium of claim 10, wherein the descriptive data includes a date associated with the event, interest, or activity.

13. The non-transitory computer-readable medium of claim 10, wherein identifying the class of the second user comprises:
accessing social networking data of the second user; and
based on the social networking data of the second user, identifying other users of the network service that share social networking characteristics with the second user, wherein the class of the second user comprises the identified other users.

14. The non-transitory computer-readable medium of claim 10, wherein identifying the class of the second user comprises:
accessing demographic data of the second user; and
based on the demographic data of the second user, identifying other users of the network service that share demographic characteristics with the second user, wherein the class of the second user comprises the identified other users.

15. The non-transitory computer-readable medium of claim 10, wherein parsing the history of activity by the second user includes analyzing images uploaded to the network service and associated with the second user to identify the one or more events, interests, or activities.

16. The non-transitory computer-readable medium of claim 10, wherein selecting the plurality of candidate songs includes determining musical preferences of the second user from the history of activity by the second user within the network service and identifying songs that are mapped to the descriptive data and the determined musical preferences of the second user.

17. The non-transitory computer-readable medium of claim 10, wherein selecting the plurality of candidate songs includes determining musical preferences of the first user from the history of activity by the first user within the network service and identifying songs that are mapped to the descriptive data and the determined musical preferences of the first user.

18. The non-transitory computer-readable medium of claim 10, further comprising instruction, that when executed by the one or more processors in a processing device, cause the processing device to perform the steps comprising:
receiving, from the first user, a selection of one or more photos and/or videos, wherein the one or more photos and/or videos are displayed during playback of the musical compilation.

19. An apparatus comprising:
a processing device; and
a memory coupled to the processing device, the memory storing instructions which, when executed by the processing device, cause the apparatus to:
receive, from a first user of a network service, an identifier associated with an account within the network service for a second user;
based on receiving the identifier, parse a history of activity by the second user within the network service to identify one or more events, interests, or activities;
present a list of the one or more identified events, interests, or activities to the first user;
receive, from the first user of the network service, a selection of data that is descriptive of the second user, wherein the descriptive data includes an event, interest, or included in the list of the one or more identified events, interests, or activities;
identify, based on accessing network service data of the second user, a social networking characteristic descriptive of the second user;
determine a class of the second user comprising other users of the network service that share the social networking characteristic with the second user;
determine, based on network service data, explicit song interests of the other users in the class of the second user;
select, based upon the descriptive data and the explicit song interests, a plurality of candidate songs, wherein the candidate songs comprise the explicit song interests;
present, to the first user in response to receiving the descriptive data, the plurality of candidate songs;
receive, from the first user, selected songs comprising a plurality of the candidate songs;
generate a media object including the selected songs as a musical compilation;
publish the media object to the network service; and
receive, from the second user of the network service, an interaction with the media object that causes the network service to play the musical compilation.

20. The apparatus of claim 19, wherein receiving the descriptive data includes receiving the descriptive data in a text input box.

* * * * *